United States Patent
Yoneyama

(10) Patent No.: US 12,318,934 B2
(45) Date of Patent: Jun. 3, 2025

(54) ROBOT PROGRAMMING DEVICE AND ROBOT PROGRAMMING METHOD

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 285 days.

(21) Appl. No.: 17/789,515

(22) PCT Filed: Mar. 2, 2021

(86) PCT No.: PCT/JP2021/007978
§ 371 (c)(1),
(2) Date: Jun. 28, 2022

(87) PCT Pub. No.: WO2021/177313
PCT Pub. Date: Sep. 10, 2021

(65) Prior Publication Data
US 2023/0046827 A1 Feb. 16, 2023

(30) Foreign Application Priority Data
Mar. 5, 2020 (JP) .................................. 2020-038051

(51) Int. Cl.
*B25J 9/16* (2006.01)

(52) U.S. Cl.
CPC ............ *B25J 9/163* (2013.01); *B25J 9/1658* (2013.01)

(58) Field of Classification Search
CPC ........ B25J 9/162; B25J 9/1656; B25J 9/1658; B25J 9/1671; G05B 19/42; G05B 2219/40392
See application file for complete search history.

(56) References Cited

U.S. PATENT DOCUMENTS

2017/0120449 A1* 5/2017 Matsunami ............ B25J 9/1676
2018/0297204 A1* 10/2018 Krasny ................... B25J 9/163

FOREIGN PATENT DOCUMENTS

| CN | 206906829 U | 1/2018 |
|---|---|---|
| JP | H4268607 A | 9/1992 |

(Continued)

OTHER PUBLICATIONS

English Machine Translation of JP2006190228A, Accessed Jun. 12, 2024.*

(Continued)

*Primary Examiner* — Jason Holloway
*Assistant Examiner* — Blake A Wood
(74) *Attorney, Agent, or Firm* — HAUPTMAN HAM, LLP

(57) ABSTRACT

A robot programming device is provided with: a robot model movement unit that moves a prescribed movable part of a robot model from a first position to a second position in accordance with instruction content; an arm inversion detection unit that detects whether or not a prescribed state has occurred in which, when the prescribed movable part of the robot model is moved to the second position, any axis constituting the robot model is rotated 180°±a first prescribed value from a rotation angle serving as a reference; and an arm inversion correction unit that, when occurrence of the prescribed state has been detected for any axis constituting the robot model, corrects the posture of the robot model when the prescribed movable part is in the second position so that said axis is not in the prescribed state.

11 Claims, 19 Drawing Sheets

(56) References Cited

FOREIGN PATENT DOCUMENTS

| | | | |
|---|---|---|---|
| JP | H5289730 | A | 11/1993 |
| JP | H10-240323 | A | 9/1998 |
| JP | 2006-068890 | A | 3/2006 |
| JP | 2006190228 | A | 7/2006 |
| JP | 2007125670 | A | 5/2007 |
| JP | 2009166172 | A | 7/2009 |
| JP | 2015174185 | A | 10/2015 |
| JP | 201942875 | A | 3/2019 |
| JP | 2019042875 | A * | 3/2019 |

OTHER PUBLICATIONS

English Machine Translation of JP2019042875A, Accessed Oct. 9, 2024 (Year: 2019).*

* cited by examiner

ROBOT PROGRAMMING DEVICE AND ROBOT PROGRAMMING METHOD

RELATED APPLICATIONS

The present application is a National Phase of International Application No. PCT/JP2021/007978, filed Mar. 2, 2021 which claims Japanese application No. 2020-038051 filed Mar. 5, 2020.

TECHNICAL FIELD

The present invention relates to a robot programming device and a robot programming method.

BACKGROUND ART

Known methods of teaching various robots including industrial robots include a so-called offline programming in which teaching is performed while simulation operation of 3D models of a robot, a workpiece, and the like is carried out on a computer (e.g., Patent Document 1 and Patent Document 2).

CITATION LIST

Patent Literature

Patent Document 1: JP 2009-166172 A
Patent Document 2: JP 05-289730 A

SUMMARY OF INVENTION

Technical Problem

Generally, in a case where teaching by offline programming is performed, a position of each axis is not verified. Thus, when a robot is actually operated according to an operation program obtained by the offline programming, unnatural movement or sudden acceleration of the robot may be caused. It is desirable to prevent such a situation from occurring in teaching by offline programming.

Solution to Problem

An aspect of the present disclosure is a robot programming device configured to perform teaching of a robot program by arranging in a virtual space representing a workspace three-dimensionally and displaying on a display screen a robot model mounted with a tool model, a workpiece model, and a peripheral device model. The robot programming device includes a robot model movement section configured to move a predetermined movable portion of the robot model from a first position to a second position in accordance with a teaching content, an arm inversion detection section configured to detect whether or not any axis included in the robot model is in a predetermined state in which the axis is rotated by 180°±a first predetermined value from a reference rotation angle when the predetermined movable portion of the robot model is moved to the second position, and an arm inversion correction section configured to correct, when any axis included in the robot model is detected as being in the predetermined state, an orientation of the robot model with the predetermined movable portion of the robot model being located at the second position so that the axis is no longer in the predetermined state.

Another aspect of the present disclosure is a robot programming method for performing teaching of a robot program by arranging in a virtual space representing a workspace three-dimensionally and displaying on a display screen a robot model mounted with a tool model, a workpiece model, and a peripheral device model. The robot programming method includes moving a predetermined movable portion of the robot model from a first position to a second position in accordance with a teaching content, detecting whether or not any axis included in the robot model is in a predetermined state in which the axis is rotated by 180°±a first predetermined value from a reference rotation angle when the predetermined movable portion of the robot model is moved to the second position, and correcting, when any axis included in the robot model is detected as being in the predetermined state, an orientation of the robot model with the predetermined movable portion of the robot model being located at the second position so that the axis is no longer in the predetermined state.

Still another aspect of the present disclosure is a robot programming method for performing teaching of a robot program by arranging in a virtual space representing a workspace three-dimensionally and displaying on a display screen a robot model mounted with a tool model, a workpiece model, and a peripheral device model. The robot programming method includes performing a simulation operation of the robot model in accordance with an operation program, displaying a first warning message when any axis included in the robot model is detected as being in a predetermined state in which the axis is rotated by 180°±a first predetermined value from a reference rotation angle during the simulation operation, displaying a second warning message when a rotation angle of any axis included in the robot model is detected as being within a second predetermined value from an upper limit or a lower limit of a predetermined operation range of the axis during the simulation operation, displaying a third warning message when a rotation amount of any axis included in the robot model with reference to a rotational position of the robot model in an orientation before movement is detected to have exceeded a set rotation angle predefined for the axis during the simulation operation, and displaying a fourth warning message when an interference among the robot model mounted with the tool model, the workpiece model, and the peripheral device model is detected during the simulation operation.

Effects of Invention

According to the configuration described above, it is possible to prevent the occurrence of situations such as an unnatural movement of a robot, a sudden acceleration of the robot, an influence on a cycle time, and an increase in a load on a cable attached to the robot.

These objects, features and advantages and other objects, features and advantages of the present invention will be further clarified from the detailed description of typical embodiments of the present invention shown in the accompanying drawings.

DESCRIPTION OF EMBODIMENTS

Figure 1:
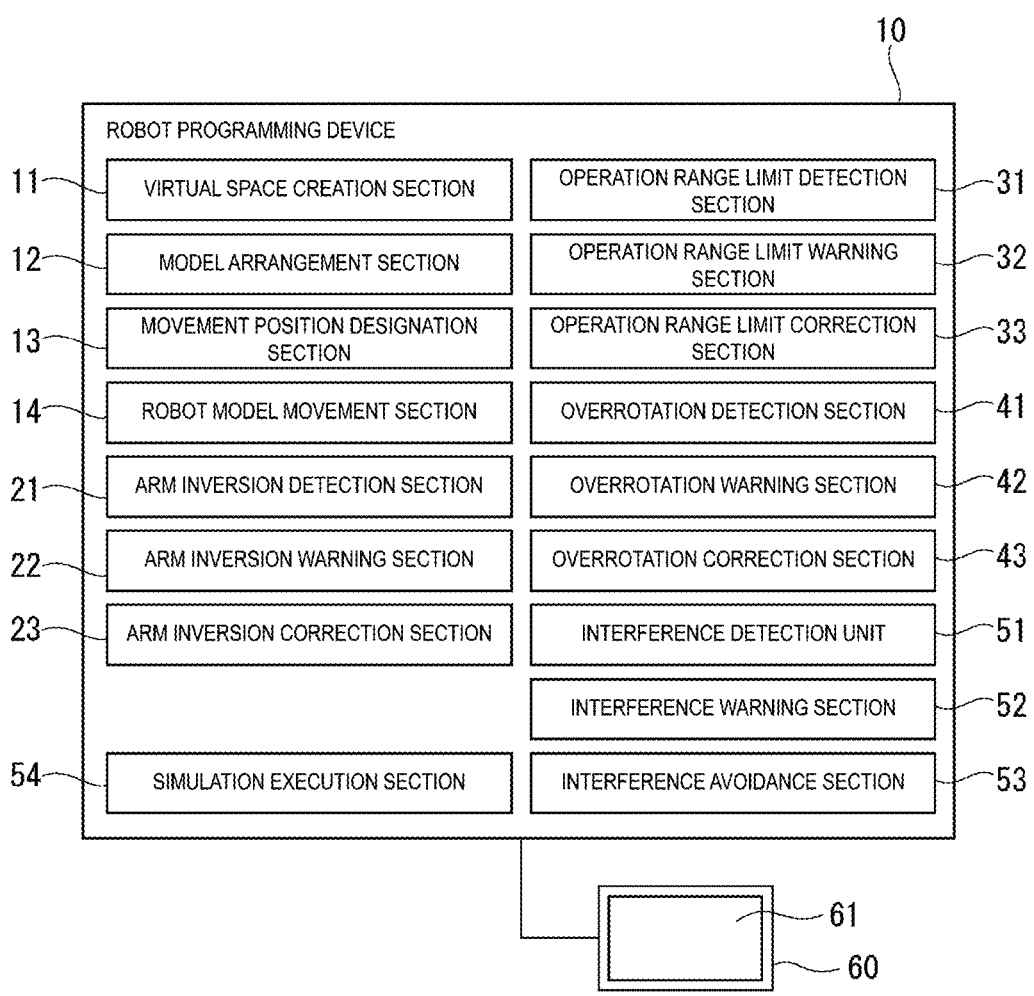
FIG. 1 is a functional block diagram of a robot programming device according to an embodiment.

Next, an embodiment of the present disclosure will be described with reference to the drawings. In the drawings to be referenced, similar components or functional parts are denoted by the same reference numerals. The drawings are appropriately scaled for ease of understanding. A form illustrated in the drawings is an example for carrying out the present invention and the present invention is not limited to the illustrated form.

FIG. 1 is a functional block diagram of a robot programming device 10 according to an embodiment. The robot programming device 10 is a programming device that performs teaching of a robot (a robot program) in an offline manner while simulatively operating 3D models of a robot, a workpiece, and the like. As illustrated in FIG. 1, the robot programming device 10 includes a virtual space creation section 11, a model arrangement section 12, a movement position designation section 13, a robot model movement section 14, an arm inversion detection section 21, an arm inversion warning section 22, an arm inversion correction section 23, an operation range limit detection section 31, an operation range limit warning section 32, an operation range limit correction section 33, an overrotation detection section 41, an overrotation warning section 42, an overrotation correction section 43, an interference detection section 51, an interference warning section 52, an interference avoidance section 53, a simulation execution section 54, and a display device 60. The robot programming device 10 may have a configuration as a general computer including a CPU, a ROM, a RAM, a storage device, an operation section (keyboard, mouse), a display section, an input/output interface, a network interface, and the like. The functional block configuration illustrated in FIG. 1 may be implemented by a CPU of the robot programming device 10 executing various types of software stored in a storage device, or may be implemented by a configuration mainly including hardware such as an Application Specific Integrated IC (ASIC).

Figure 3:
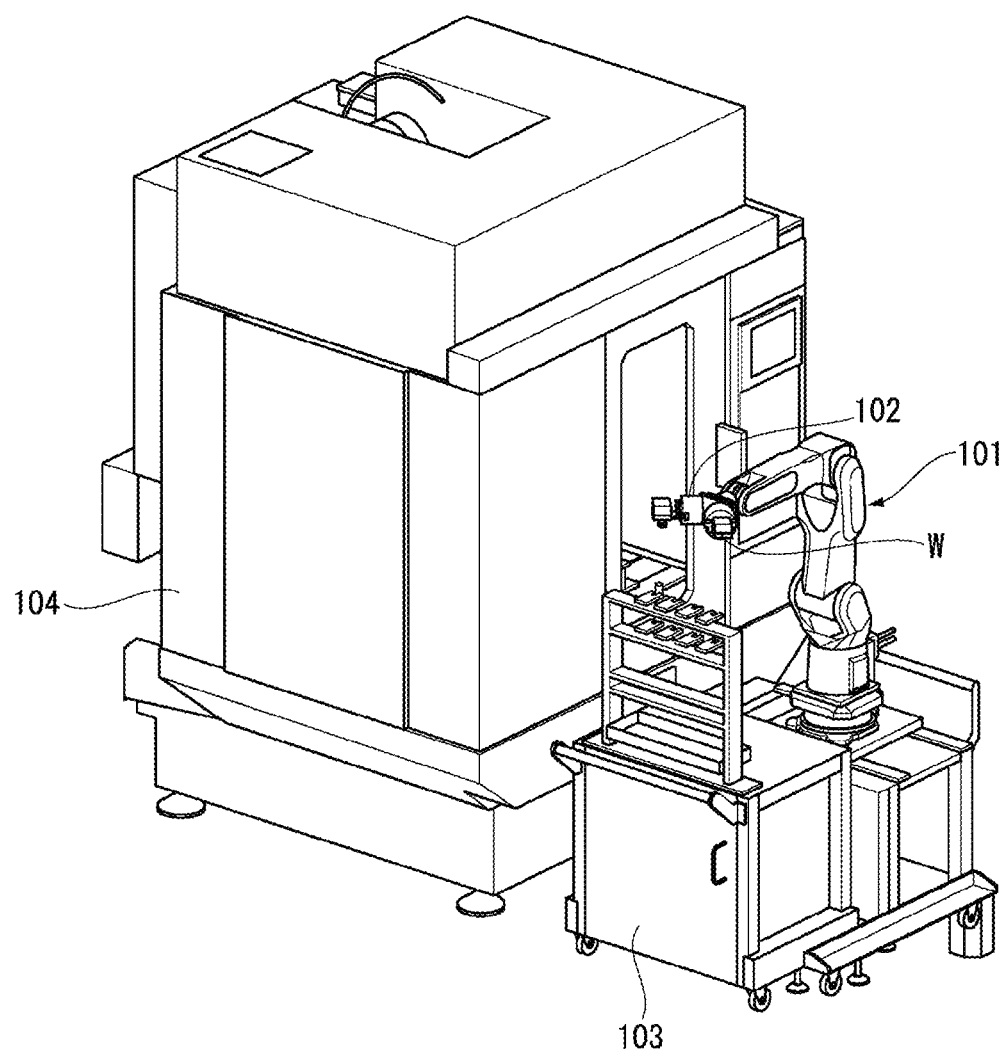
FIG. 3 is a diagram illustrating a state in which a robot model, a workpiece model, and a peripheral device model are arranged and displayed in a virtual space (a display screen).

The virtual space creation section 11 creates a virtual space that represents a workspace three-dimensionally. The model arrangement section 12 arranges a robot model 101 mounted with a tool model 102, a workpiece model W, and peripheral device models (103 and 104) in the virtual space, and displays them on a display screen 61 of the display device 60 at the same time. FIG. 3 illustrates a state in which the robot model 101 on which the tool model 102 is virtually mounted, the workpiece model W, a movable platform model 103 on which a storage rack for a workpiece W is mounted, and a machine model 104 are arranged by the model arrangement section 12 in the virtual space (the display screen) created by the virtual space creation section 11.

Figure 4A:
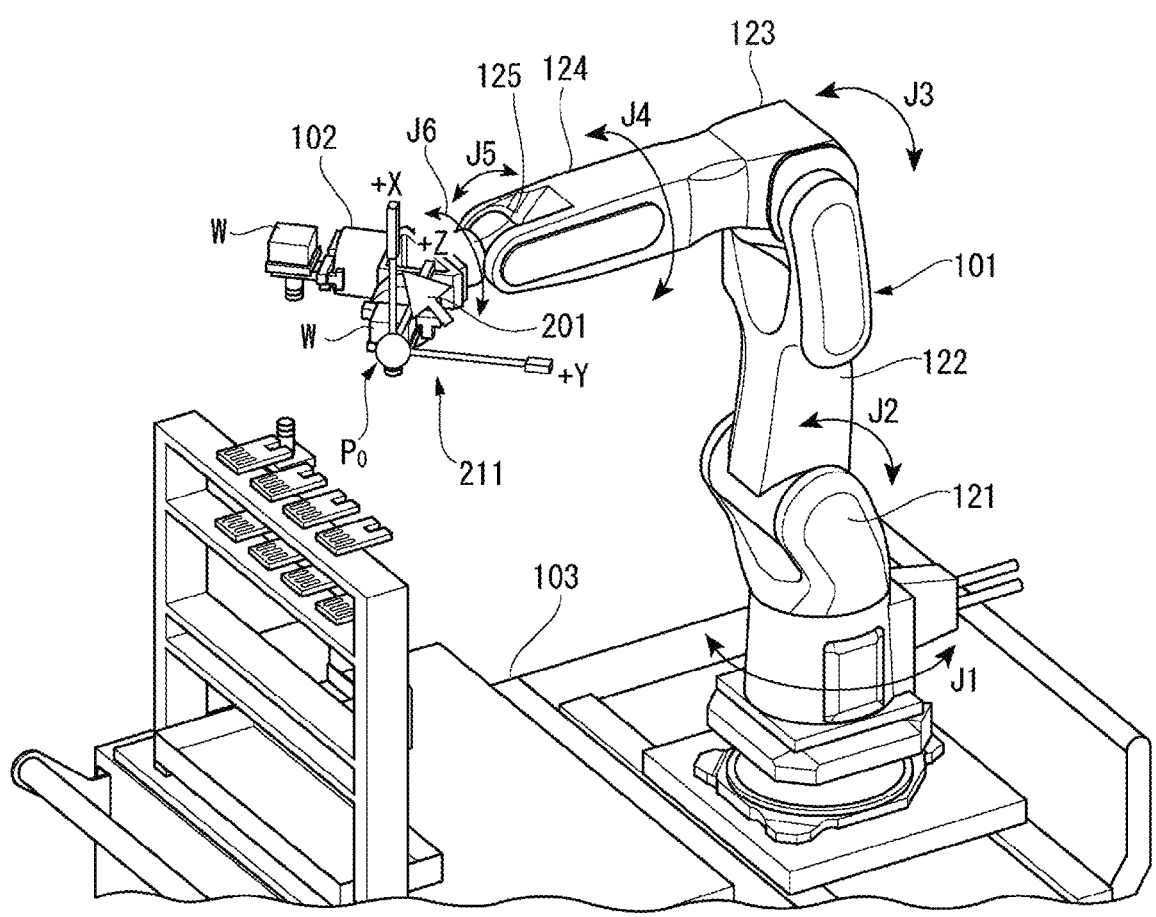
FIG. 4A is a diagram illustrating designation of a movement destination of a robot by dragging with a mouse.

The robot model 101 is a model of a 6-axis vertical articulated robot in the present embodiment, but other types of robot models may be used. The configuration of the robot model 101 will be described with reference to FIG. 4A. As illustrated in FIG. 4A, the robot model 101 includes six axes, i.e., a J1 axis, a J2 axis, a J3 axis, a J4 axis, a J5 axis, and a J6 axis in this order from a base side. The J1 axis rotates a first link 121 around an axis perpendicular to an installation surface. The J2 axis rotates a second link 122. The J3 axis rotates a third link 123. The J4 axis rotates a fourth link 124. The J5 axis rotates a fifth link 125. The J6 axis rotates a tip of a wrist. The tool model 102 is mounted on the tip of the wrist of the robot model 101. The tool model 102 is a hand device including two chucks in the present embodiment, but other types of tool models may be used. As illustrated in FIG. 4A, coordinate axes of a tool coordinate system 211 may be displayed at a tool tip position $P_0$.

The movement position designation section 13 receives designation of a movement destination of a predetermined movable portion (the tool tip position in the present embodiment) of the robot model 101 in the virtual space. The robot model movement section 14 moves a tool tip portion of the robot model 101 from a position before movement (a first position) to a movement destination position (a second position) in accordance with teaching content. Here, the teaching content includes an operation program prepared in advance as well as a teaching position designated by an operator via the movement position designation section 13. That is, the robot model movement section 14 has a function of moving the robot model 101 and the like to a teaching position designated by an operator via the movement position designation section 13, and a function of simulatively operating the robot model 101 and the like in accordance with an operation program prepared in advance and stored in the robot programming device 10.

The arm inversion detection section 21 detects whether or not any of the axes included in the robot model 101 is in a predetermined state in which the axis is rotated by 180°±a first predetermined value from a reference rotation angle (hereinafter referred to as "inverted state") when the tool tip portion of the robot model 101 is moved to the movement destination position. Here, the first predetermined value is assumed to be 10°, 20°, 30°, or the like. However, the first predetermined value may be set in the robot programming device 10 in advance, or the robot programming device 10 (the arm inversion detection section 21) may be configured such that an operator can input and set the first predetermined value. The arm inversion warning section 22 displays a warning message on the display screen 61 when any of the axes included in the robot model 101 is detected as being in the inverted state by the arm inversion detection section 21. When any of the axes included in the robot model 101 is detected as being in the inverted state, the arm inversion correction section 23 corrects the orientation of the robot model 101 with the tool tip portion being located at the movement destination position so that the axis is no longer in the inverted state.

When the robot model 101 is caused to assume an orientation at the movement destination position, the operation range limit detection section 31 detects whether or not a rotation angle of any of the axes included in the robot model 101 is within a second predetermined value from an upper limit or a lower limit of a predetermined operation range of the axis. Here, the second predetermined value is a threshold value for determining that the upper limit or the lower limit of the operation range is being approached, and is assumed to be, for example, 5°, 10°, or 15°. However, the second predetermined value may be set in the robot programming device 10 in advance, or the robot programming device 10 (the movement range limit detection section 31) may be configured such that an operator can input and set the second predetermined value.

When a rotation angle of any of the axes included in the robot model 101 is detected as being within the second predetermined value from the upper limit or the lower limit of the predetermined operation range of the axis, the operation range limit warning section 32 displays a warning message on the display screen 61. When a rotation angle of any of the axes included in the robot model 101 is detected as being within the second predetermined value from the upper limit or the lower limit of the predetermined operation range of the axis, the operation range limit correction section 33 corrects the orientation of the robot model 101 such that the rotation angle of the axis is no longer within the second predetermined value from the upper limit or the lower limit of the predetermined operation range.

When the robot model 101 is caused to assume an orientation at the movement destination position, the overrotation detection section 41 detects whether or not a rotation amount of any of the axes included in the robot model 101 with reference to a rotational position of the robot model 101 in an orientation before movement has exceeded a set rotation angle predefined for the axis. The set rotation angle for each axis can be input and set to the robot programming device 10 by an operator. For example, in a case where an operator wants the robot not to move so largely, the set rotation angle can be set to a relatively small value.

When a rotation amount of any of the axes included in the robot model 101 with reference to a rotational position of the robot model 101 in an orientation before the movement is detected to have exceeded a set rotation angle predefined for the axis, the overrotation warning section 42 displays a warning message on the display screen 61. When a rotation amount of any of the axes included in the robot model 101 with reference to a rotational position of the robot model 101 in an orientation before the movement is detected to have exceeded a set rotation angle predefined for the axis, the overrotation correction section 43 corrects the orientation of the robot model 101 so that the rotation angle of the axis no longer exceeds the set rotation angle.

When the robot model 101 is caused to assume an orientation at the movement destination position, the interference detection section 51 detects whether or not an interference occurs among the robot model 101 mounted with the tool model 102, the workpiece model W, and the peripheral device models (103 and 104). When the interference is detected, the interference warning section 52 displays a warning message on the display screen 61. When the interference is detected, the interference avoidance section 53 corrects the orientation of the robot model 101 so that the interference no longer occurs.

Figure 2:
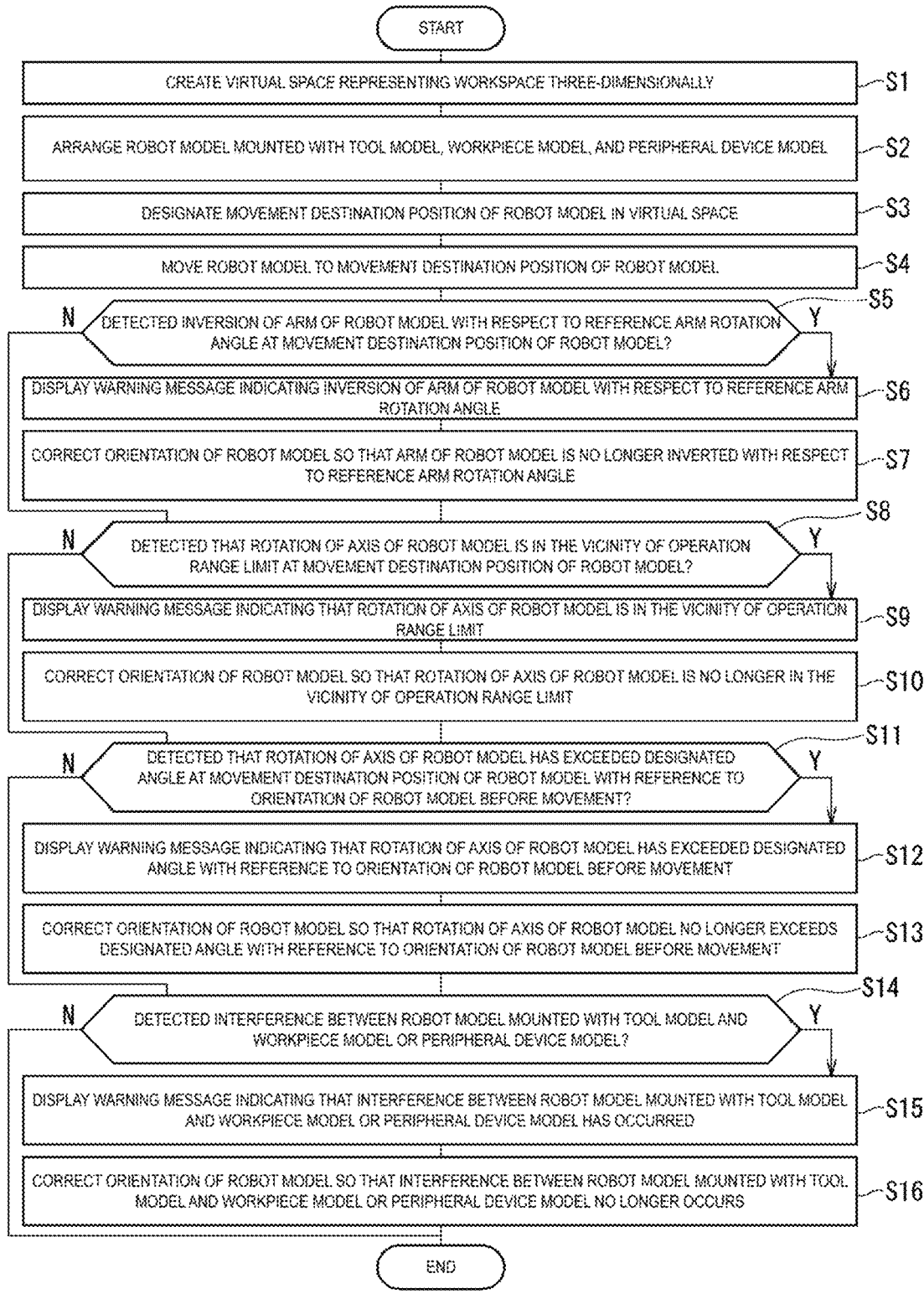
FIG. 2 is a flowchart illustrating an offline teaching process.

FIG. 2 is a flowchart illustrating an offline teaching process (robot programming method) executed under the control of a CPU of the robot programming device 10. The teaching process will be described below with reference to the flowchart of FIG. 2 and simulation screen examples illustrated in FIG. 3 and subsequent figures. Upon start of the teaching process, first, the virtual space creation section 11 creates a virtual space that represents a workspace three-dimensionally (step S1). Next, the model arrangement section 12 arranges the robot model 101 mounted with the tool model 102, the workpiece model W, and the peripheral device models in the virtual space (step S2). Here, as illustrated in FIG. 3, the robot model 101 mounted with the tool model 102, the workpiece model W, the movable platform model 103, and the machine model 104 are simultaneously displayed in the virtual space.

Figure 4B:
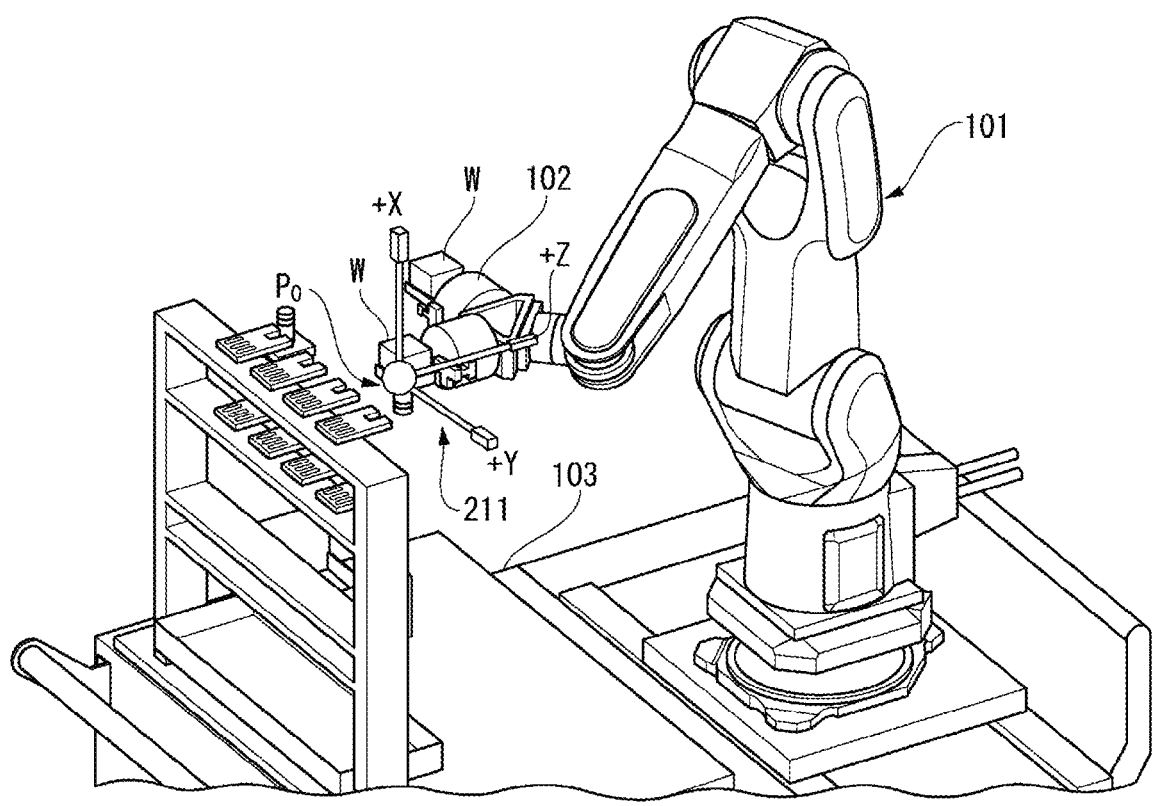
FIG. 4B is a diagram illustrating designation of a movement destination of a robot by dragging with a mouse.

Next, the operation of designating a movement destination position of a tool tip portion of the robot model 101 is received via the movement position designation section 13 (step S3). Examples of receiving the operation of designating the movement destination of the tool tip portion of the robot model 101 will be described. The first example of the operation of designating the movement destination of the robot model 101 is a mouse drag operation. In this case, an operator moves a mouse cursor 201 to the tool tip portion of the robot model 101 and then presses a button of the mouse as illustrated in FIG. 4A. Then, the user moves the mouse cursor 201 to a desired movement destination position while dragging the mouse as illustrated in FIG. 4B. In the example of FIG. 4B, the operator moves the tool tip portion of the robot model 101 to the vicinity of the storage rack for the workpiece. While the mouse is being dragged, the robot model movement section 14 performs an inverse kinematics calculation based on a tool tip position to move the robot model 101 so as to follow the movement of the mouse cursor 201 (step S4).

Figure 5A:
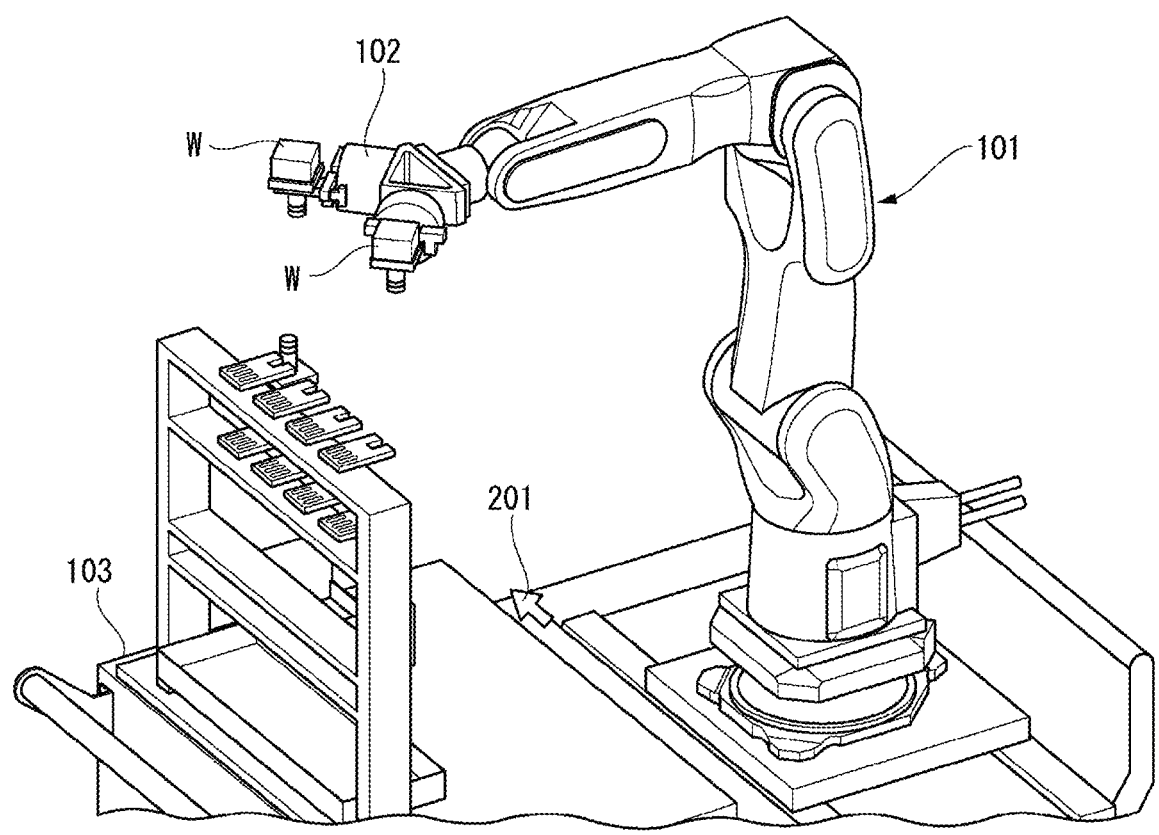
FIG. 5A is a diagram illustrating designation of a movement destination of a robot by clicking with a mouse.
Figure 5B:
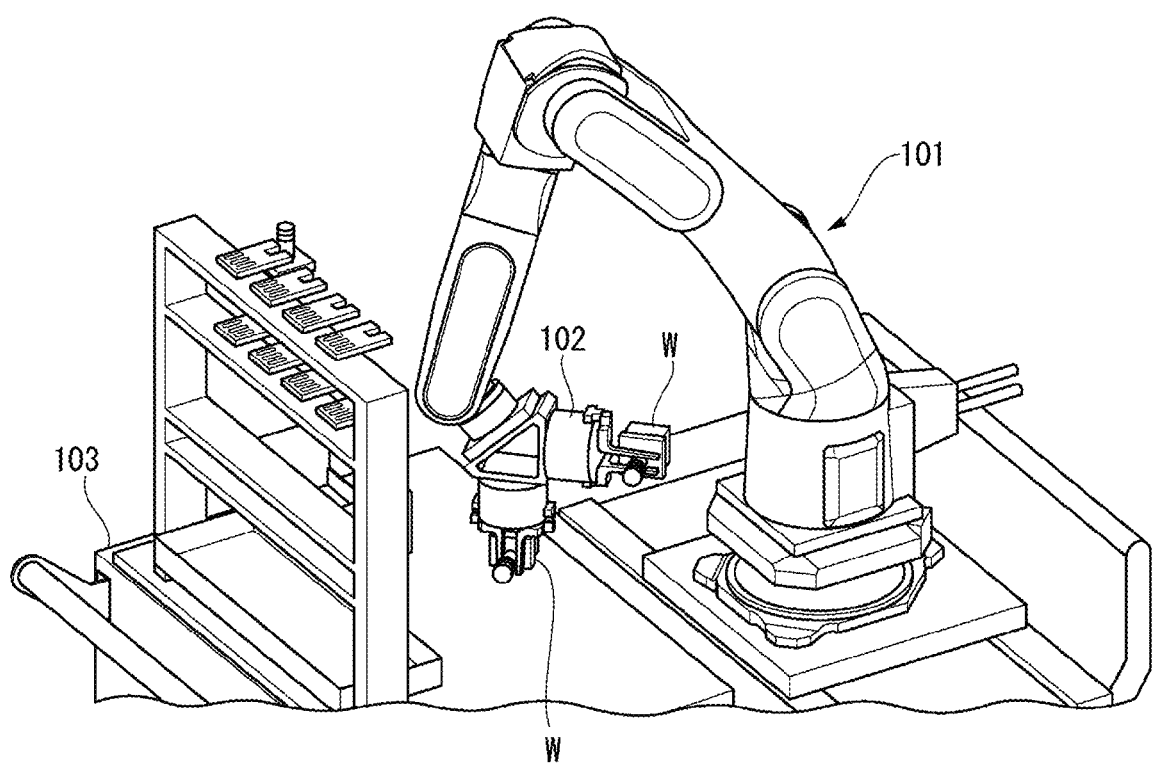
FIG. 5B is a diagram illustrating designation of a movement destination of a robot by clicking with a mouse.

The second example of the operation of designating the movement destination of the robot model 101 is an example in which the movement destination of the tool tip portion is designated by a mouse click operation. For example, as illustrated in FIG. 5A, the operator moves the mouse cursor 201 to a desired position to which the tool tip portion is to be moved, and then clicks the mouse. In this case, the robot model movement section 14 performs an inverse kinematics calculation based on the movement destination position designated by clicking the mouse to move the tool tip portion of the robot model 101 to the movement destination position as illustrated in FIG. 5B (step S5).

Figure 6A:
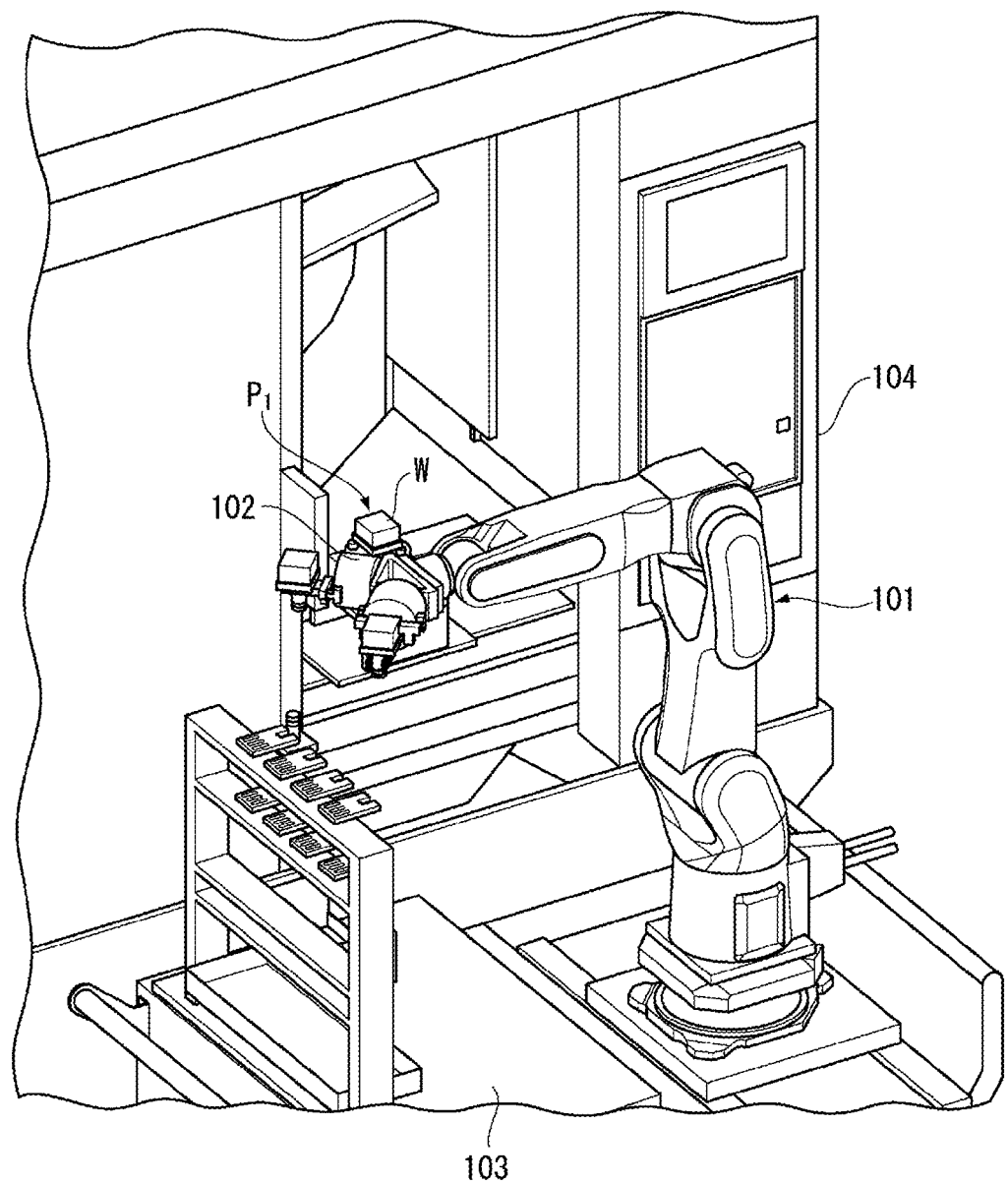
FIG. 6A is a diagram illustrating designation of a movement destination of a robot by clicking with a mouse (designation of a workpiece position).
Figure 6B:
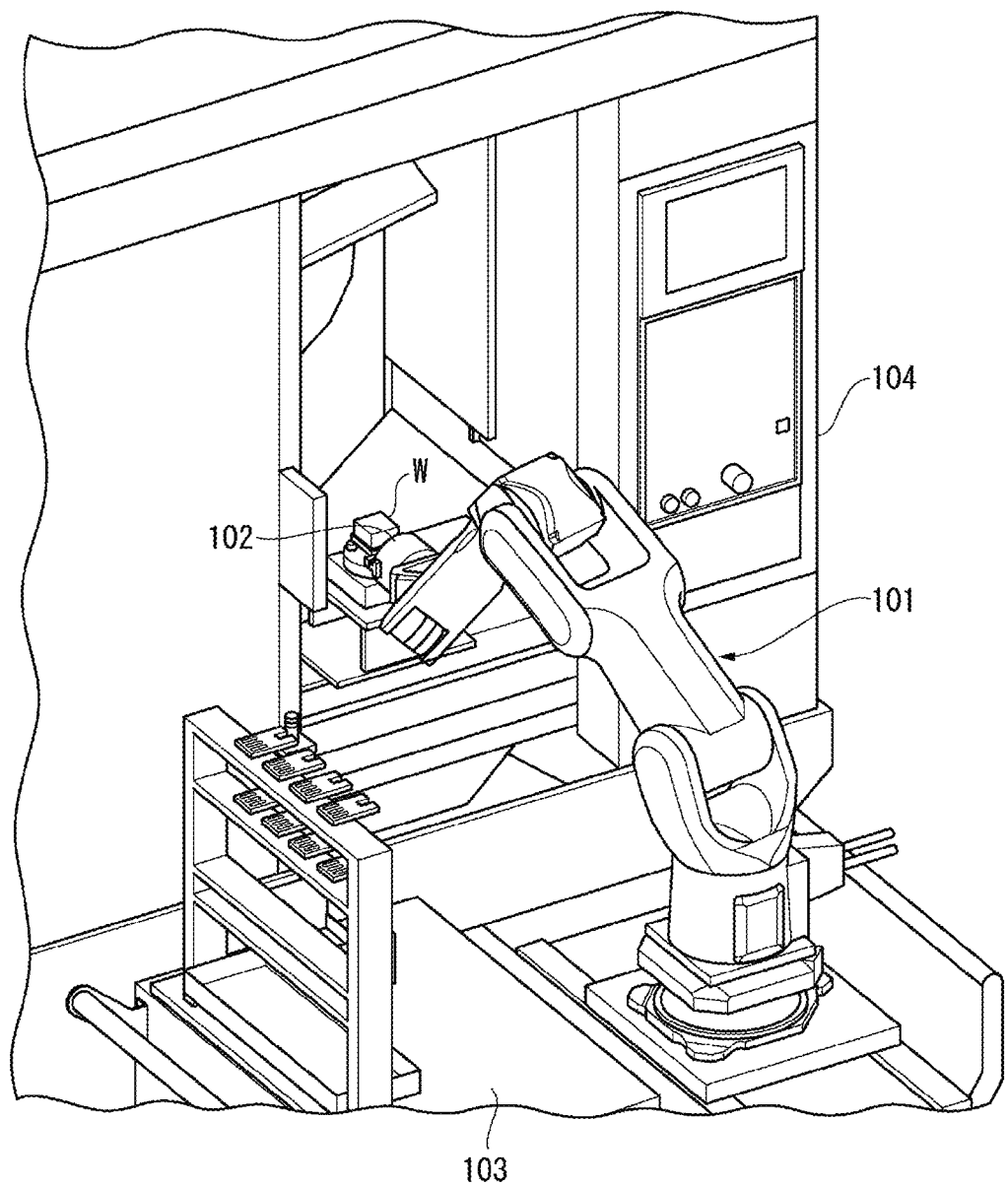
FIG. 6B is a diagram illustrating designation of a movement destination of a robot by clicking with a mouse (designation of a workpiece position).
Figure 6C:
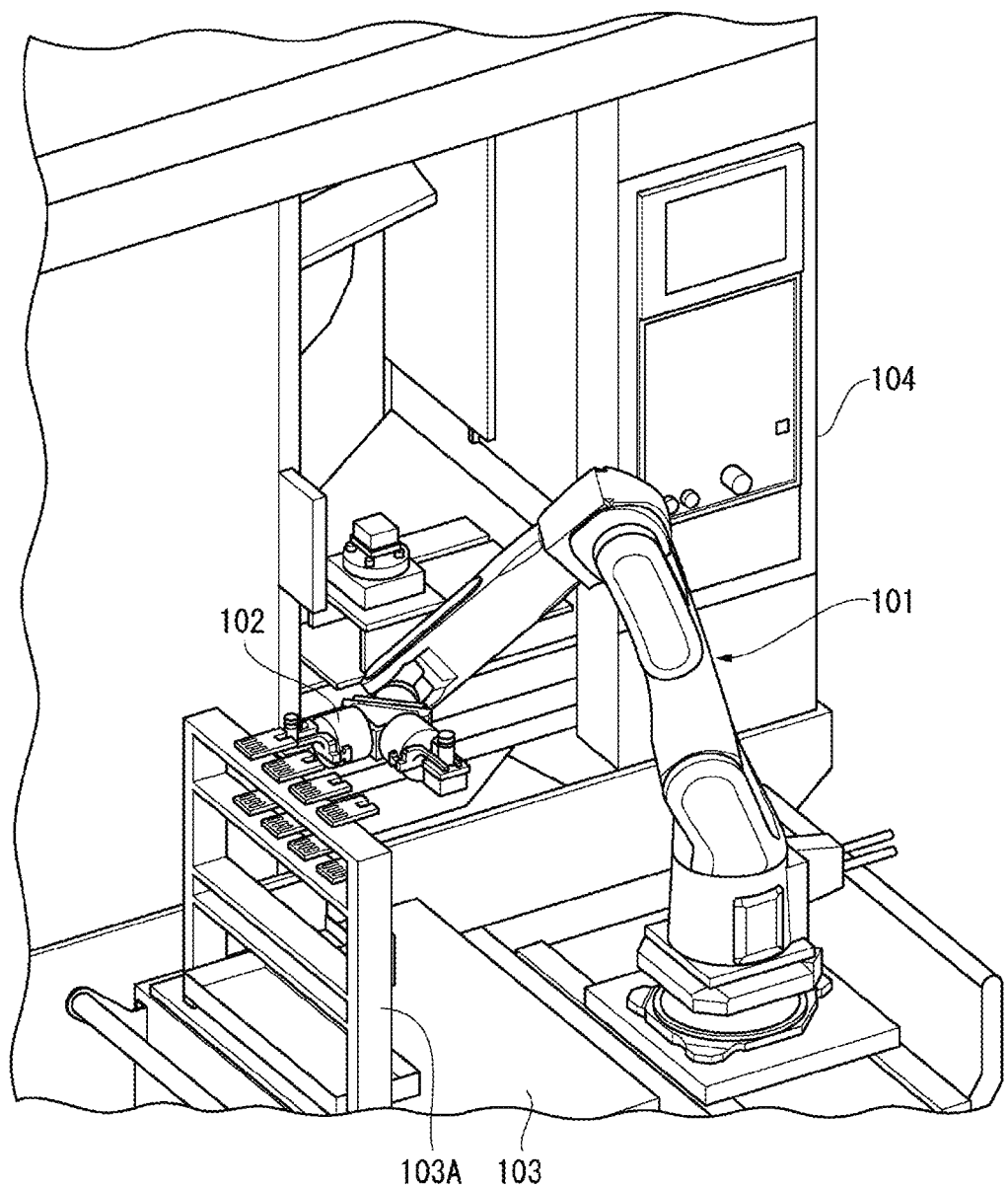
FIG. 6C is a diagram illustrating designation of a movement destination of a robot by clicking with a mouse (designation of a storage rack position).

Next, examples of the operation of moving the robot model 101 by designating a workpiece to be held will be described with reference to FIGS. 6A to 6C. As illustrated in FIG. 6A, an operator designates a position P1 of the workpiece model W arranged inside the machine model 104 by, for example, a mouse click operation. In response to the above operation, the robot model movement section 14 moves the tool tip portion of the robot model 101 to the designated position P1 (FIG. 6B). Alternatively, in a case where an operator designates a position of the storage rack 103A for the workpiece W as the movement destination of the tool tip portion of the robot model 101, the robot model movement section 14 moves the tool tip portion of the robot model 101 to the designated position (FIG. 6C).

Next, when the robot model 101 is moved to the movement destination position designated via the movement position designation section 13, the arm inversion detection section 21 detects whether or not any of the axes included in the robot model 101 is in the inverted state with respect to a reference arm rotation angle (step S5). Here, the reference rotation angle may be, for example, 0° or a position before the movement, or a set angle defined by an operator.

Figure 7A:
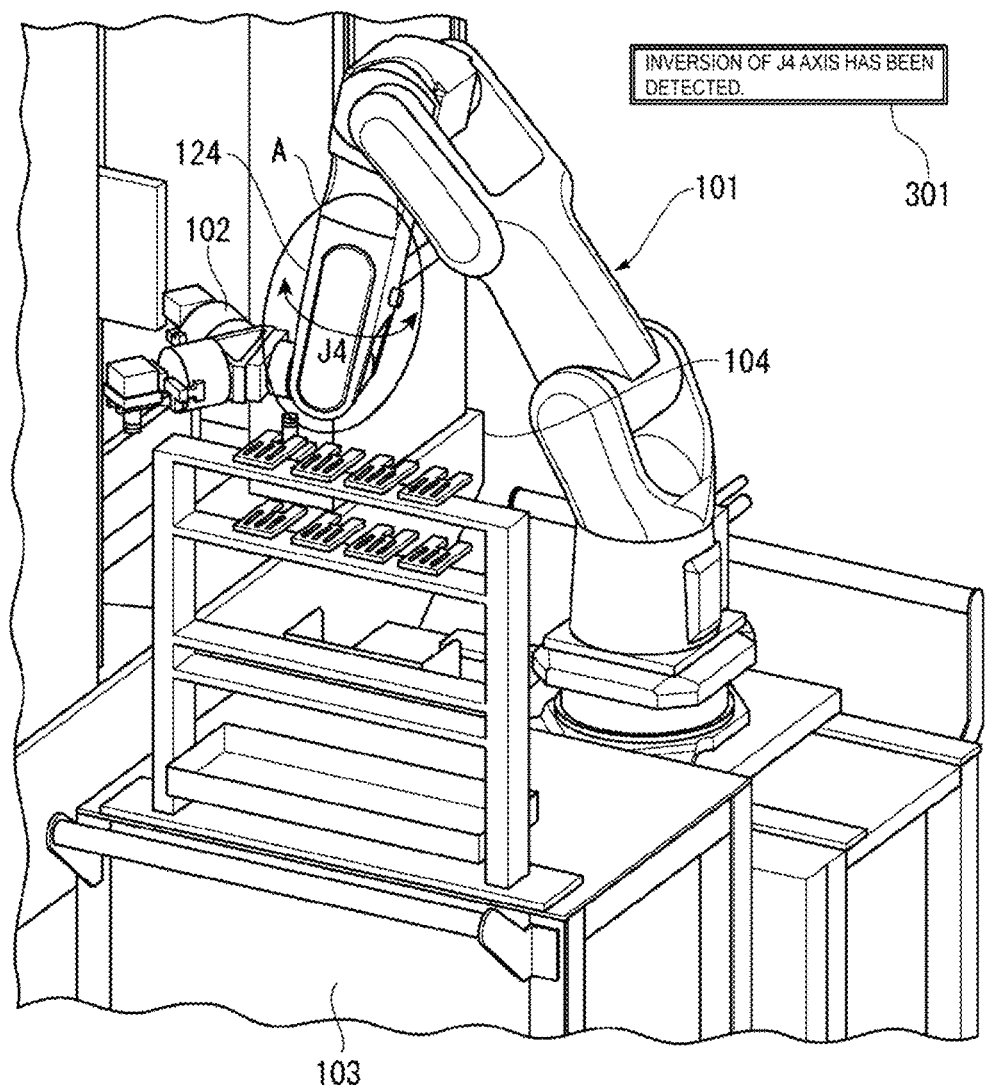
FIG. 7A is a diagram for explaining detection and correction of an inversion state of an axis.

FIG. 7A illustrates a state in which the tool tip portion of the robot model 101 is moved to a designated position and thereby the J4 axis (the fourth link 124) is inverted (rotated by180°) with respect to an orientation at a reference rotation angle of 0°. In this case (S5: YES), the arm inversion warning section 22 displays on the display screen 61 a warning message 301 indicating that the J4 axis is inverted (step S6), as illustrated in FIG. 7A. The arm inversion warning section 22 may further display a mark A surrounding the inverted axis (link) so that the operator can quickly perceive the axis (link) that is in the inverted state. If no inverted state is detected (S5: NO), the process proceeds to step S8.

Figure 7B:
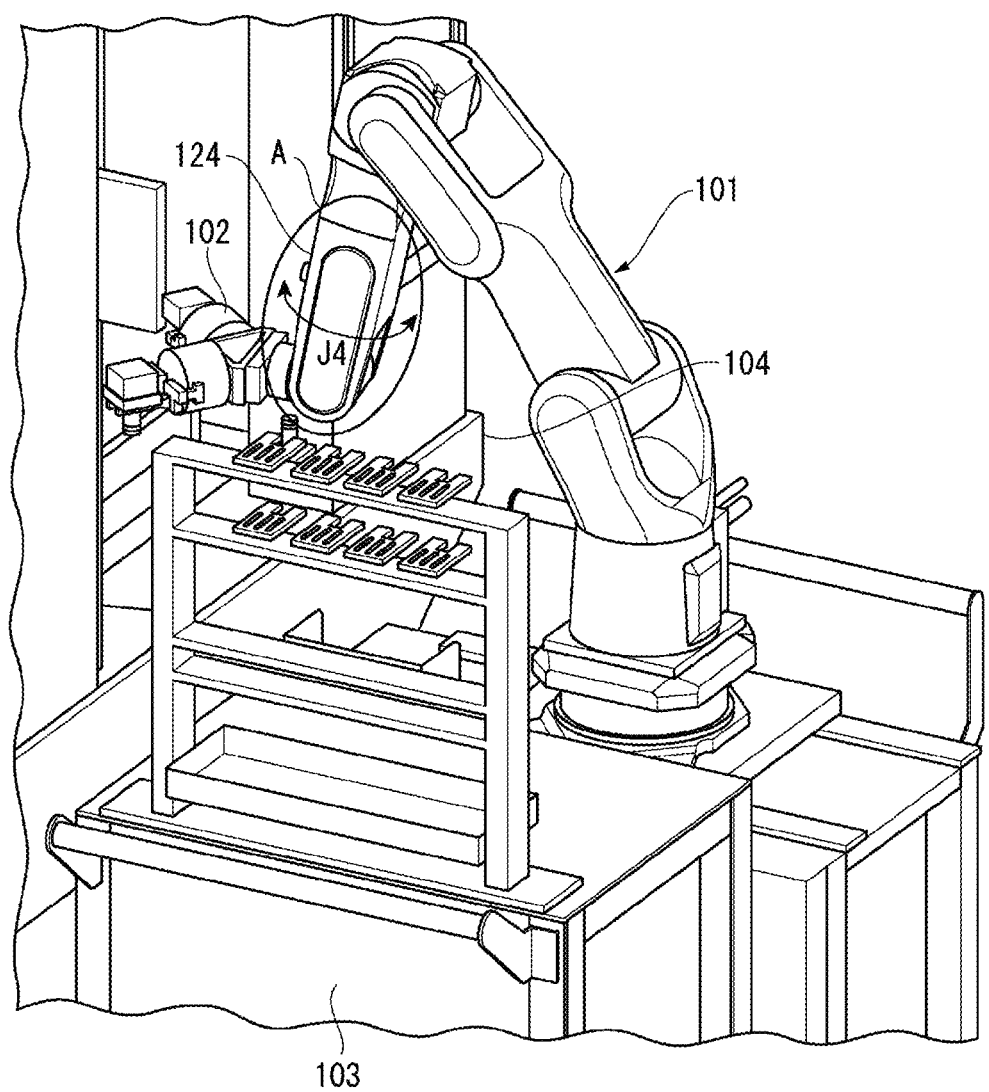
FIG. 7B is a diagram for explaining detection and correction of an inversion state of an axis.

When such inversion is detected, the arm inversion correction section 23 corrects the orientation of the robot model 101 at the movement destination position of the arm tip portion so that the J4 axis detected as being inverted is no longer inverted, as illustrated in FIG. 7B (step S7). In correcting the orientation of the robot model 101, the correction is performed in such a manner that the tool tip position does not change as much as possible. Here, the correction of the orientation of the robot model 101 at the movement destination position may be performed according to the rules below:

(a1) The tool tip position should not be moved as much as possible;
(a2) Basically, only an axis angle should be corrected;
(a3) When (a1) and (a2) described above cannot be observed, the tool tip should be moved by parallel translation or the like to correct the orientation.

The calculation according to these rules can be performed by appropriately applying a kinematics calculation or an inverse kinematics calculation.

In the example of FIG. 7B, since the robot model 101 can keep the same orientation even when the J4 axis is rotated by 180°, the rotation angle of the J4 axis is corrected to 0° while the position of the tool tip portion is maintained. The arm inversion correction section 23 may be configured to perform correction according to a predetermined correction condition so that the orientation of the robot model 101 does not change significantly before and after the correction. For example, correction angle ranges of −30° to +30° for the J4 axis, −30° to +30° for the J5 axis, and −360° to +360° for the J6 axis may be set. These correction conditions may be input and set to the robot programming device 10 (the arm inversion correction section 23) by an operator.

By ensuring that the inversion of the axes (i.e., respective links included in the arm) will not occur as described above, it is possible to prevent the occurrence of situations such as an unnatural movement of a robot, a sudden acceleration of the robot, an influence on a cycle time, and an increase in a load on a cable attached to the robot.

Next, when the robot model 101 is moved to the movement destination position designated via the movement position designation section 13, the operation range limit detection section 31 detects whether or not any of the axes included in the robot model 101 is in the vicinity of a limit of a predetermined operation range (step S8). Here, the operation range limit detection section 31 detects whether or not the axis is in the vicinity of the predetermined operation range by detecting whether or not the angle of the axis is within a second predetermined value from an upper limit or a lower limit of the predetermined operation range.

Figure 8A:
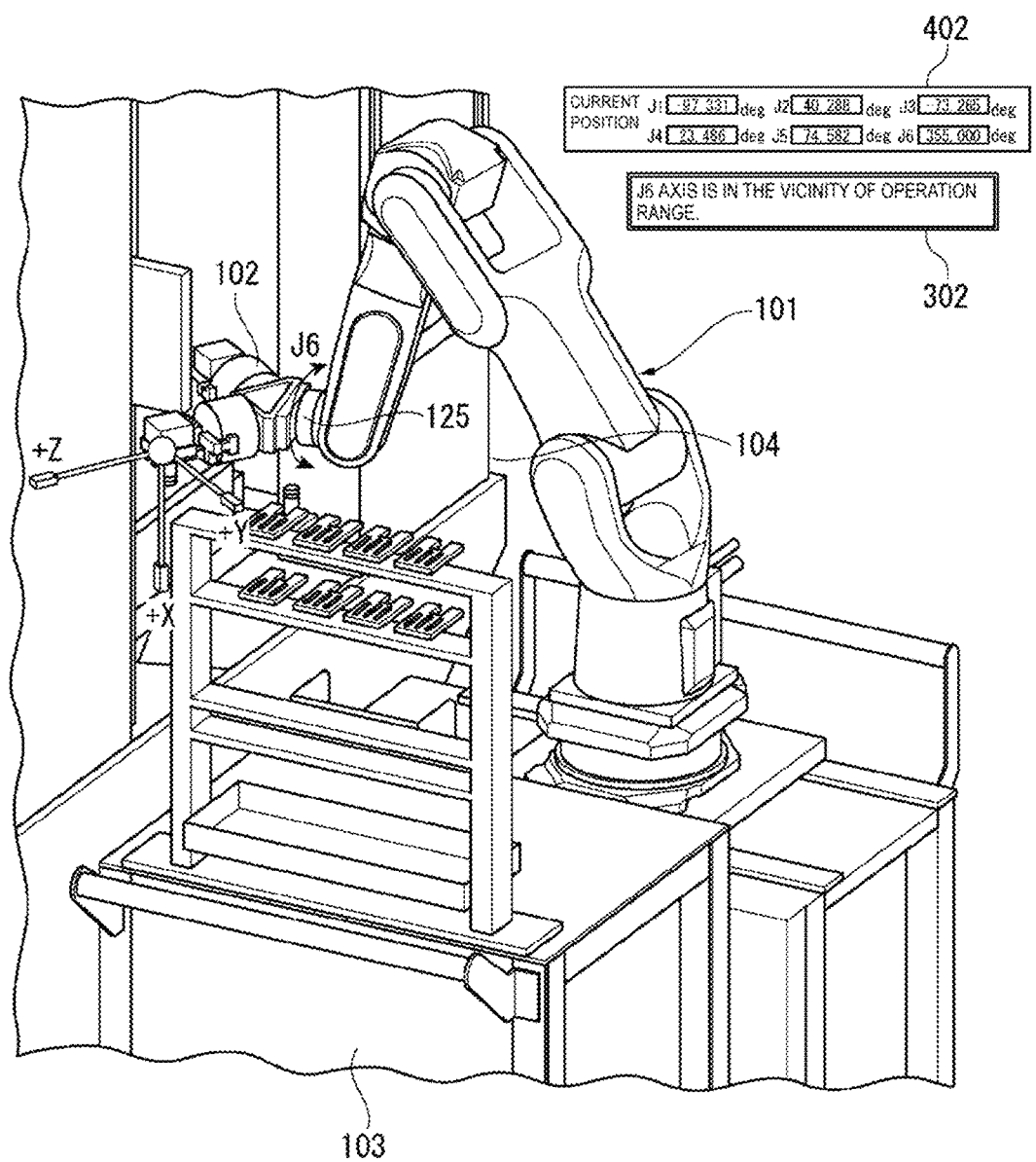
FIG. 8A is a diagram for explaining detection and correction of a state in which an axis is in the vicinity of a limit of an operation range.

For example, it is assumed that the operation range of the J6 axis is from −360° to +360°, and the second predetermined value is 10°. FIG. 8A illustrates the orientation of the robot model 101 at the movement destination, and an indication box 402 indicating the orientation (angles of the respective axes) of the robot model 101 at the movement destination position is displayed on the screen illustrated in FIG. 8A. Since the rotation angle of the J6 is 355° in this orientation, the operation range limit detection section 31 determines that the J6 axis is in the vicinity of the limit of the operation range (S8: YES), and displays a warning message 302 indicating that fact on the display screen (step S9).

Figure 8B:
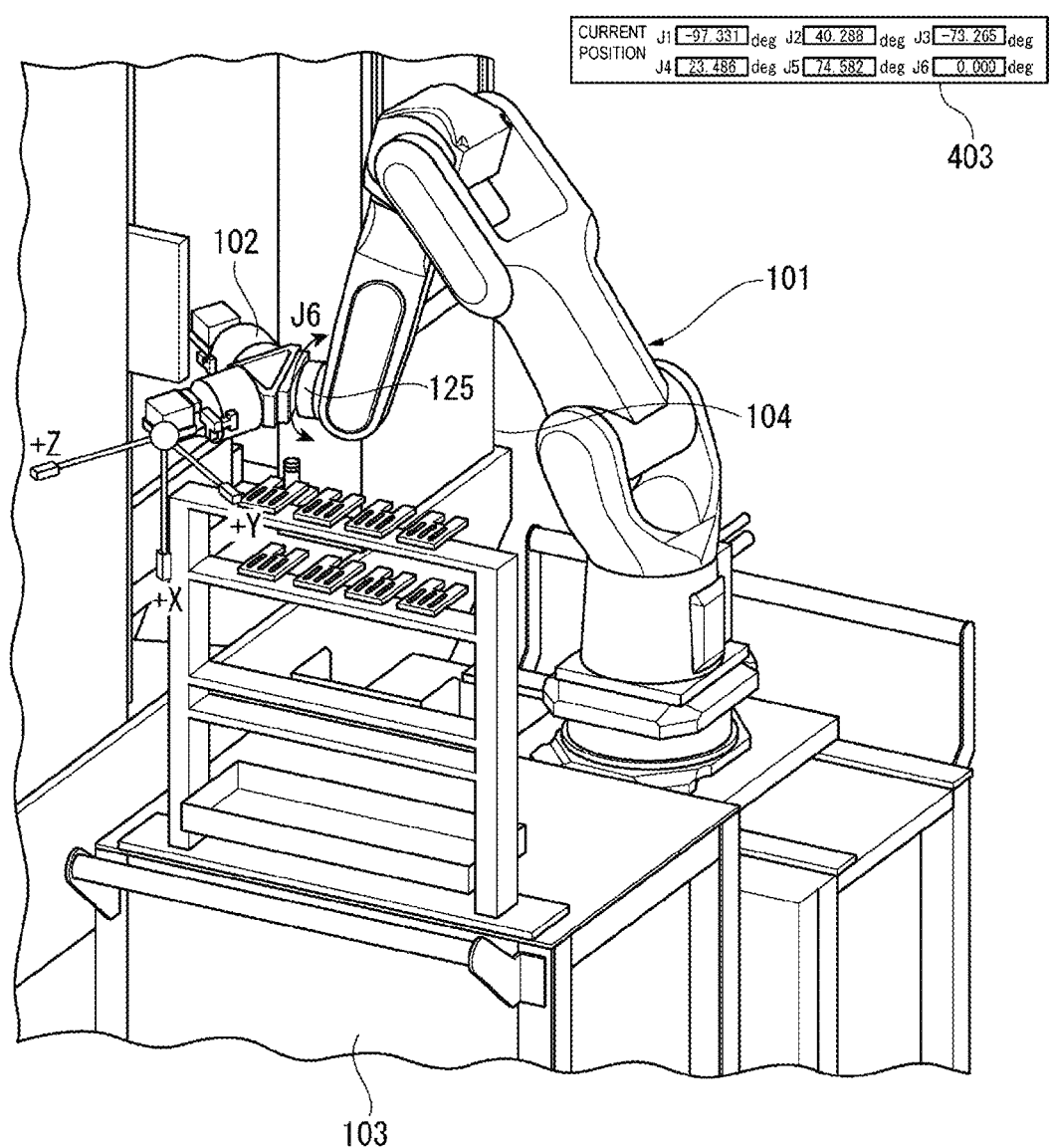
FIG. 8B is a diagram for explaining detection and correction of a state in which an axis is in the vicinity of a limit of an operation range.

Next, the operation range limit correction section 33 corrects the orientation of the robot model 101 so that the angle of the axis detected as being in the vicinity of the limit of the operation range is no longer in the vicinity of the limit of the operation range (step S10). The correction in this case may also be performed according to the rules (a1) to (a3) above. In FIG. 8B, the rotation angle of the J6 is corrected to 0° from the orientation in which the J6 has made approximately one rotation as illustrated in FIG. 8A so that the position and the orientation of the robot model 101 do not change before and after the correction (see a display box 403). As a correction condition, a correction range for each of the axes may be set by the operation range limit correction section 33 so that the orientation of the robot model 101 does not significantly change before and after the correction. For example, correction angle ranges of −30° to +30° for the J4 axis, −30° to +30° for the J5 axis, and −360° to +360° for the J6 axis may be set. Since the position and the orientation of the robot model 101 may not change even when the J6 axis makes one rotation, the correction range of ±360° is allowed. These correction conditions may be input and set to the robot programming device 10 (the operation range limit correction section 33) by an operator. When none of the rotation angles of the axes included in the robot model 101 are detected as being in the vicinity of the limit of the predetermined operation range in step S8 (S8: NO), the process proceeds to step S11.

By ensuring that the axes will not be in the vicinity of the limit of the operating range as described above, it is possible to prevent an unnatural movement of the robot, a sudden acceleration of the robot, and the like.

Figure 9A:
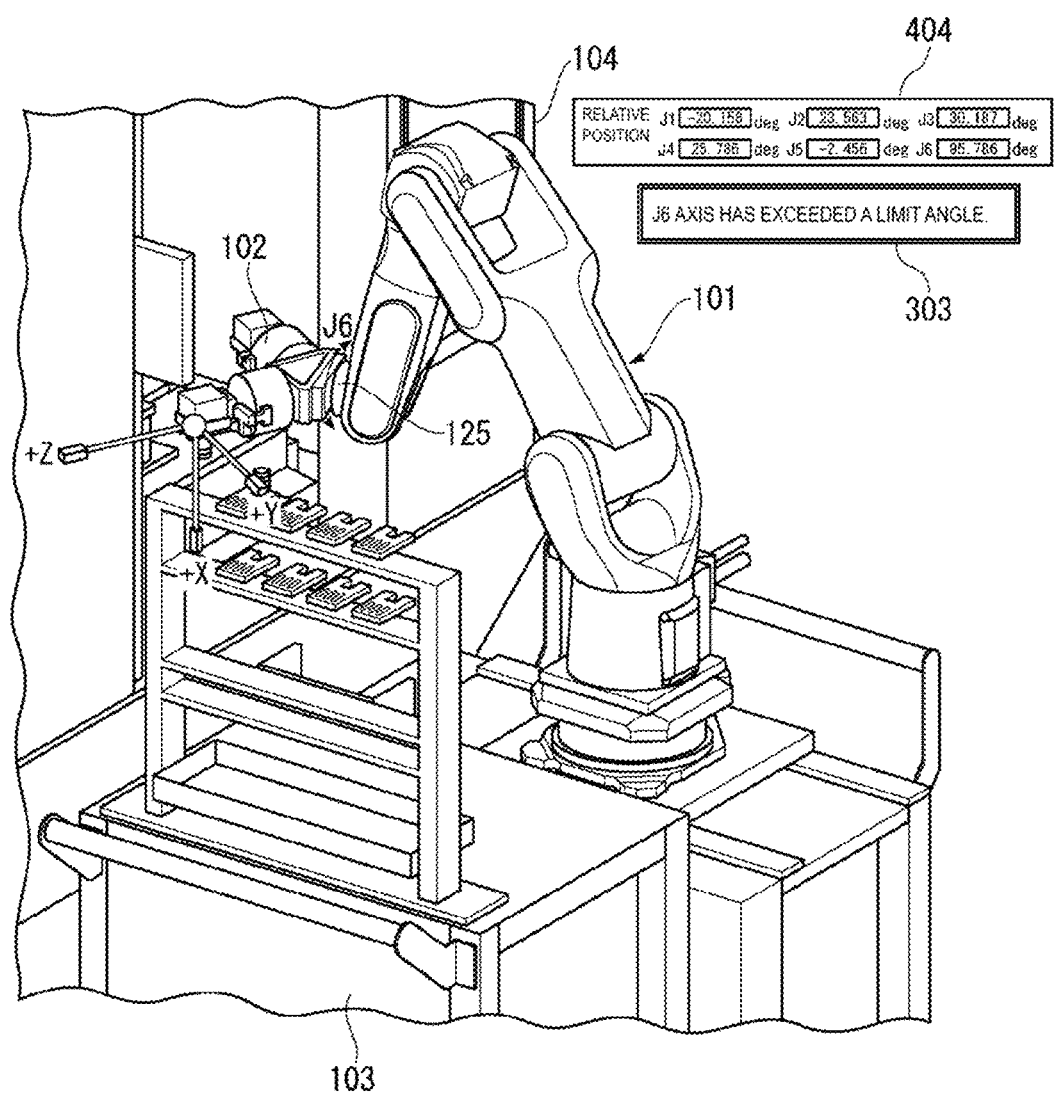
FIG. 9A is a diagram for explaining detection and correction of an overrotation state of an axis.

Next, when the robot model 101 is moved to the movement destination position designated via the movement position designation section 13, the overrotation detection section 41 detects whether or not a rotation amount of any of the axes included in the robot model 101 with reference to a rotational position of the robot model 101 in an orientation before the movement has exceeded a set rotation angle defined for the axis (step S11). That is, it is detected whether or not any of the axes has rotated excessively. FIG. 9A illustrates the orientation of the robot model 101 that has moved to the movement destination, and, on the upper right of the display screen, an indication box 404 indicating a relative change amount of the position of each of the axes from the orientation before the movement to the current orientation of the robot model 101.

Here, for example, it is assumed that the set rotation angles are −30° to +30° for the J4 axis, −30° to +30° for the J5 axis, and −90° to +90° for the J6 axis. In this case, since the relative rotation angle of the J6 axis)(95.786° exceeds the set rotational angle, the overrotation detection section 41 detects that the J6 axis has excessively rotated (S11: YES). Then, the overrotation warning section 42 displays a warning message 303 indicating that the J6 axis has excessively rotated on the display screen 61 (step S12). Next, the overrotation correction section 43 corrects the orientation of the robot model 101 so that the axis whose relative rotation angle has exceeded the set rotation angle is no longer in excess of the set rotation angle (step S13).

Figure 9B:
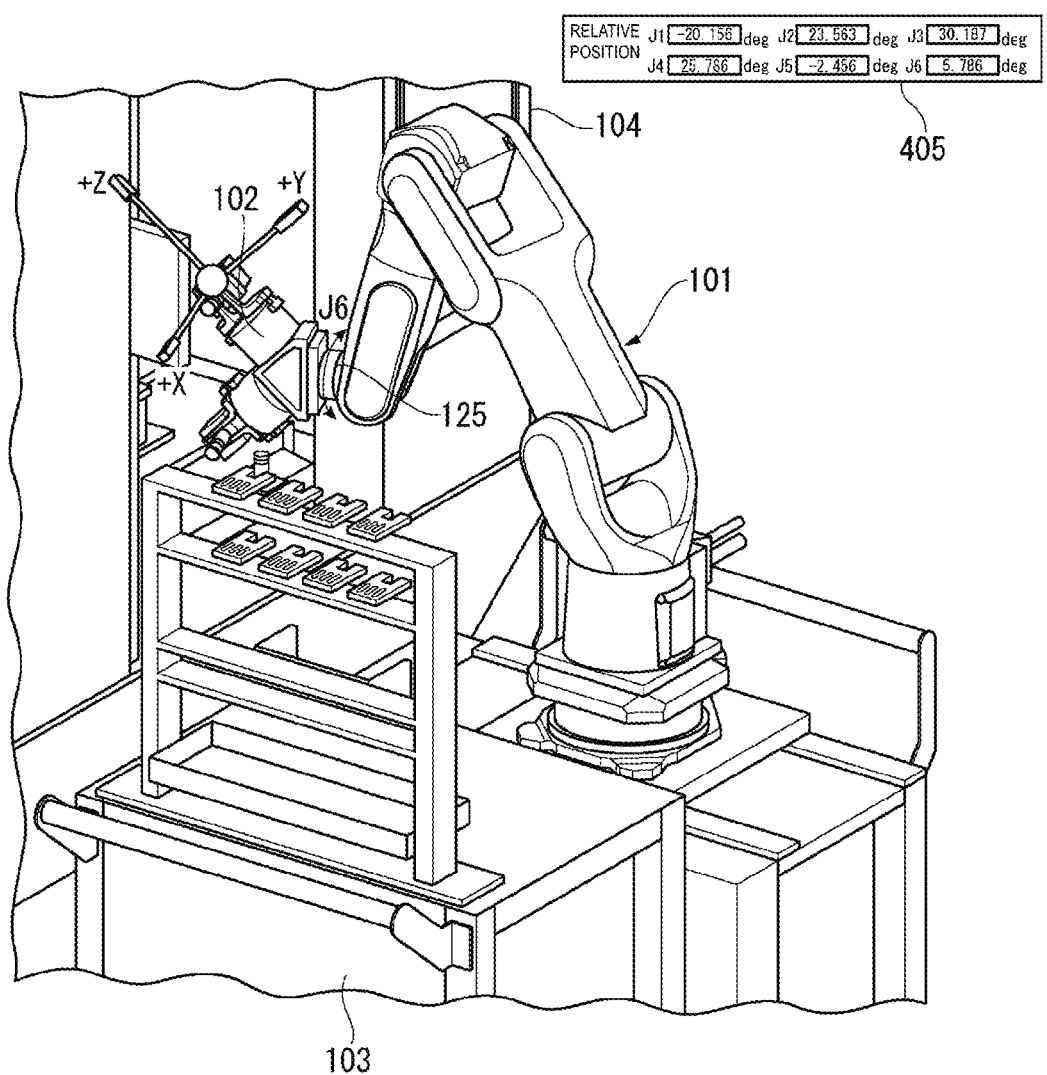
FIG. 9B is a diagram for explaining detection and correction of an overrotation state of an axis.

A correction range for each of the axes may be set by the overrotation correction section 43 so that the orientation of the robot model 101 does not significantly change before and after the correction. For example, correction angle ranges of −30° to +30° for the J4 axis, —30° to +30° for the J5 axis, and −90° to +90° for the J6 axis may be set. The correction in this case may also be performed according to the rules (a1) to (a3) above. These correction conditions may be input and set to the robot programming device 10 (the overrotation correction section 43) by an operator. As indicated in an indication box 405 in FIG. 9B, the angle of the J6 axis is corrected by −90° so as to correct the rotation angle of the J6 to 5.786° that falls within the set rotation angle. When none of the rotation amounts of the axes included in the robot model 101 with reference to a rotational position of the robot model 101 in an orientation before the movement are detected as having exceeded the set rotation angles predefined for the axes in step S11 (S11: NO), the process proceeds to step S14.

By avoiding excessive rotation of the axes from the previous orientations as described above, it is possible to prevent the occurrence of situations such as an unnatural movement of a robot, a sudden acceleration of the robot, an influence on a cycle time, and an increase in a load on a cable attached to the robot.

Figure 10A:
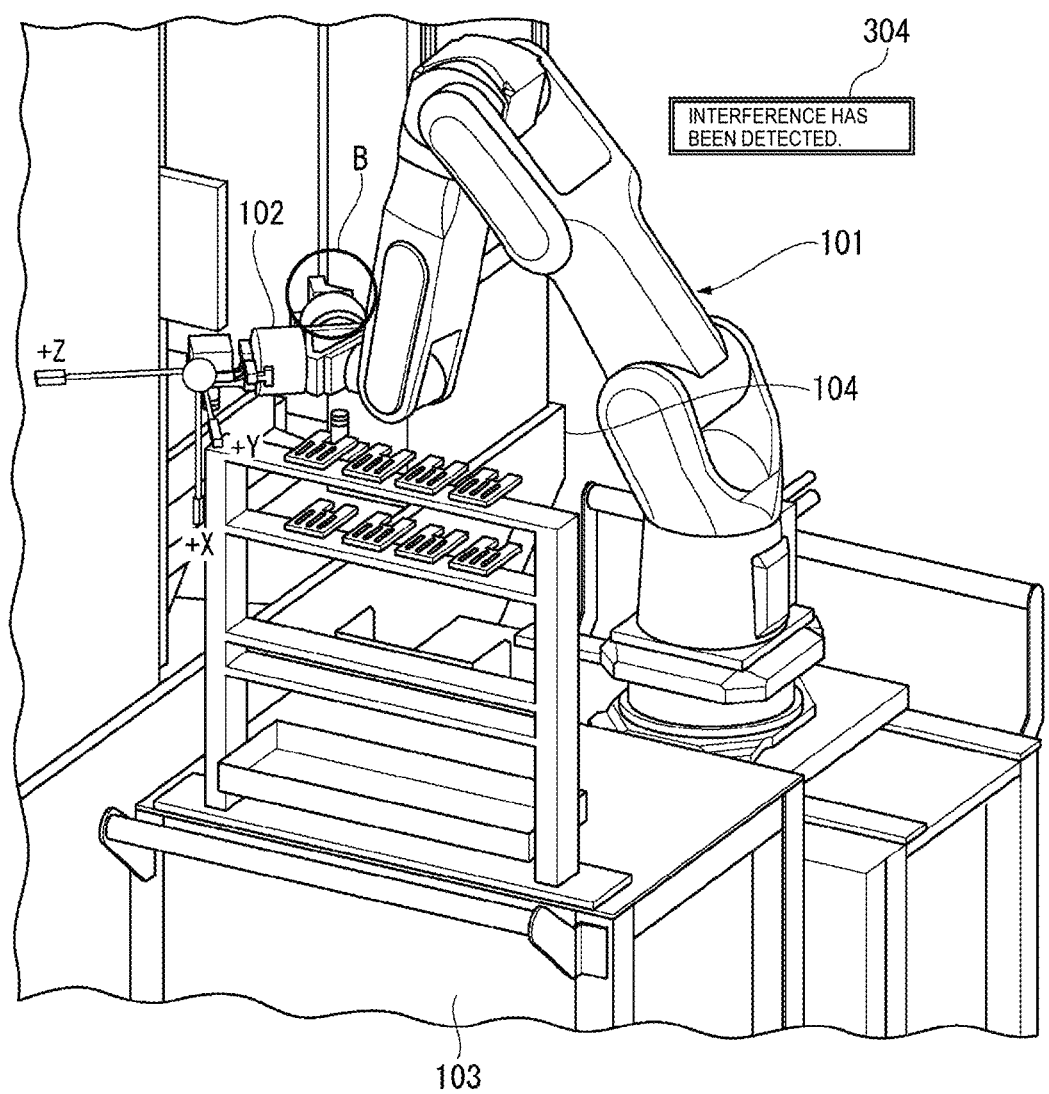
FIG. 10A is a diagram for explaining detection and correction of an interference state.

Next, when the robot model 101 is moved to the movement destination position designated via the movement position designation section 13, the interference detection section 51 detects whether or not an interference occurs among the robot model 101 mounted with the tool model 102, the workpiece model W, and the peripheral device models (103 and 104) (step S14). FIG. 10A illustrates the orientation of the robot model 101 that has moved to the movement destination. Here, an interference between the tool model 102 and the machine model 104 is detected at the position indicated by a circle B. When the interference is detected as described above (S14: YES), the interference warning section 52 displays a warning message 304 indicating that the interference has occurred (step S15). The interference warning section 52 may further display a mark B at the position where the interference has occurred so that an operator can quickly perceive the position where the interference has occurred.

Figure 10B:
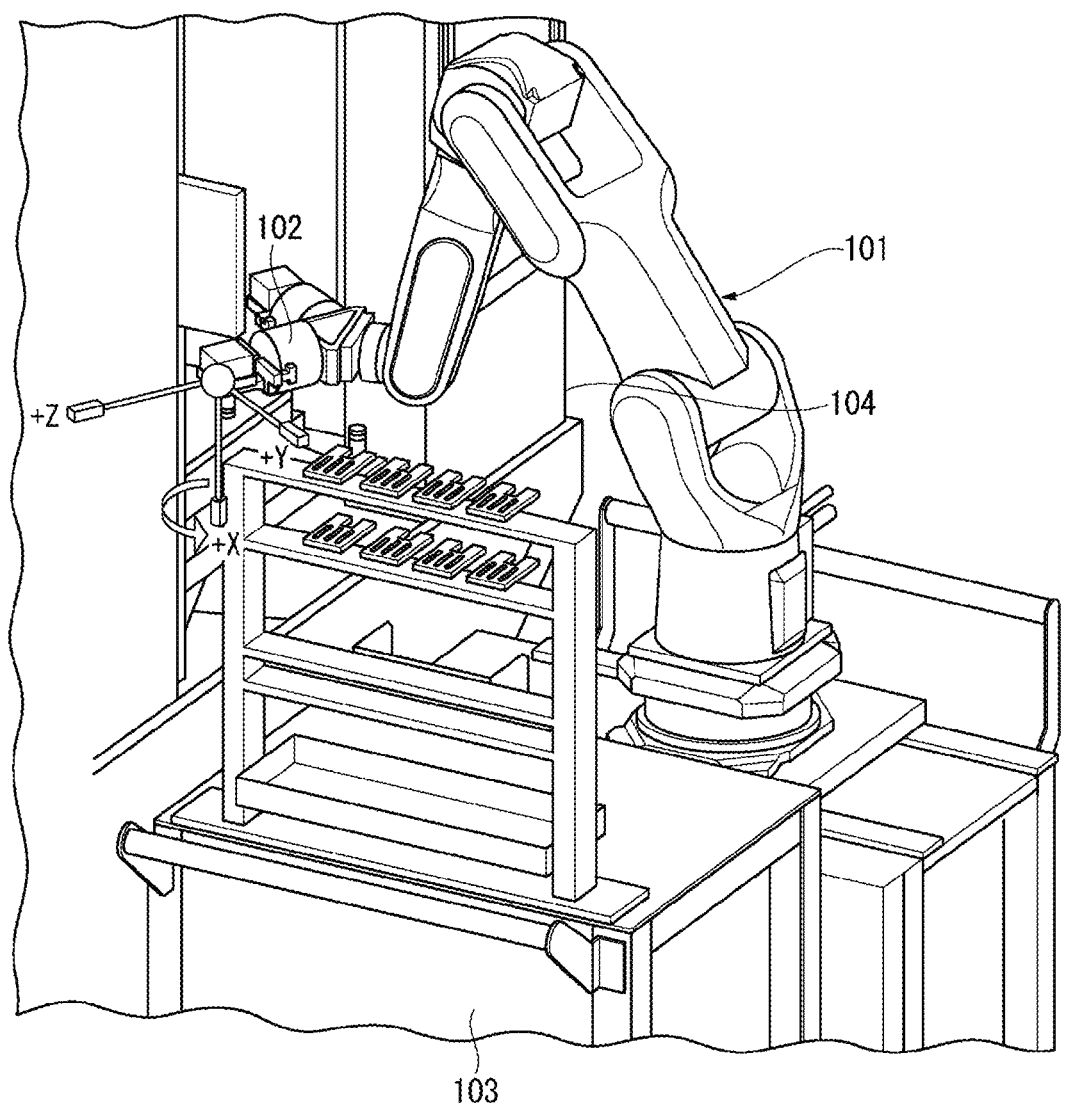
FIG. 10B is a diagram for explaining detection and correction of an interference state.

When the interference is detected as described above, the interference avoidance section 53 corrects the position of the robot model 101 so as to avoid the interference (step S16). FIG. 10B illustrates an operation example in which the position of the robot model 101 is corrected without changing the tool tip position by rotating the tool model 102 around an X axis of a tool coordinate system set at a tool tip from the state illustrated in FIG. 10A, and thereby the interference is avoided. When no interference is detected in step S14 (S14: NO), the teaching process is terminated.

In this manner, the occurrence of interference among the robot model 101 mounted with the tool model 102, the workpiece model W, and the peripheral device models (103 and 104) can be avoided. As illustrated in the flowchart of FIG. 2, the detection and correction of interference (S14 to S16) may be performed in a state in which the detection and correction of an inverted axis (S5 to S7), the detection and correction of an axis being in the vicinity of an operation limit (S8 to S10), and the detection and correction of an excessively rotated axis (S11 to S13) have been performed.

Figure 11:
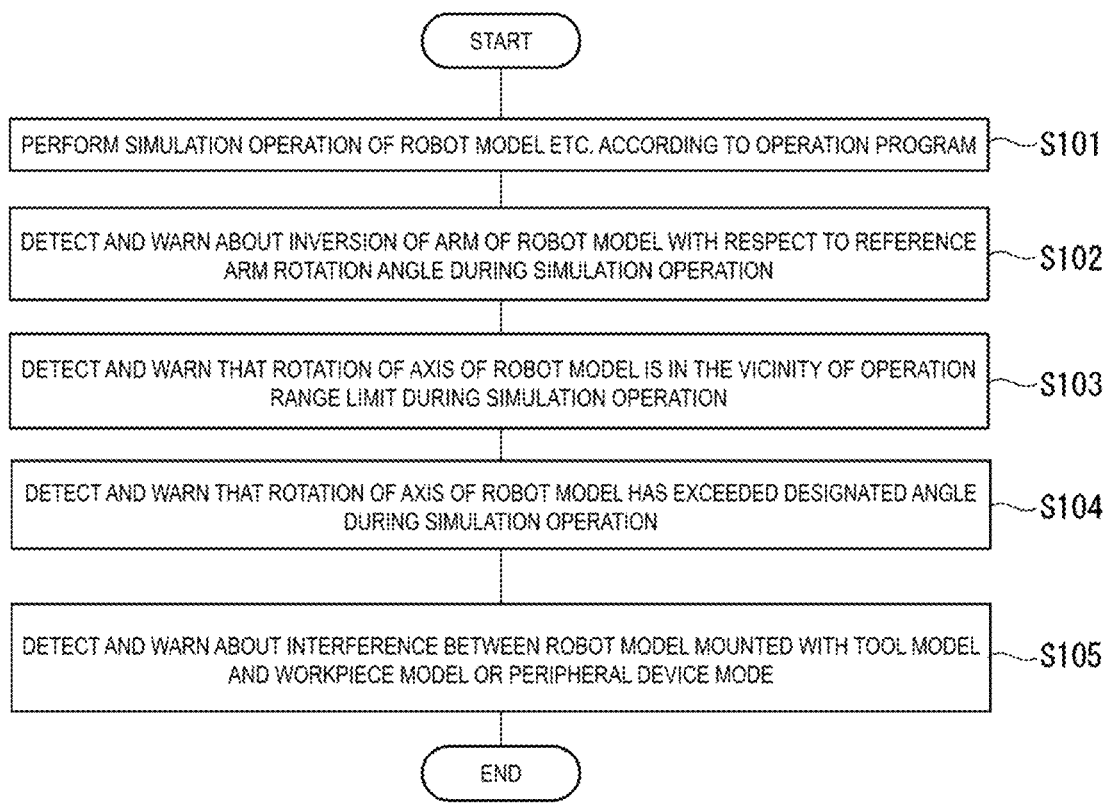
FIG. 11 is a flowchart of a simulation operation by a simulation execution section.

Next, operations performed by the simulation execution section 54 will be described. The simulation execution section 54 executes a simulation in which 3D models of a robot, a workpiece, and the like are simulatively operated in accordance with an operation program prepared in advance while checking for an inverted state, a limit of an operation range, rotation in excess of a set angle, or interference each described above, and a warning message is displayed when any of these states occurs. The simulation execution section 54 performs these simulation operations in cooperation with the virtual space creation section 11, the model arrangement section 12, the arm inversion detection section, the arm inversion warning section 22, the operation range limit detection section 31, the operation range limit warning section 32, the overrotation detection section 41, the overrotation warning section 42, the interference detection section 51, and the interference warning section 52. FIG. 11 is a flowchart of a simulation operation (a robot programming method) executed by the simulation execution section 54.

First, in step 101, the robot model 101 is simulatively operated in accordance with an operation program. Next, in step S102, when any of the axes included in the robot model 101 is detected as being in the inverted state in which the axis is rotated by 180°±the first predetermined value from a reference rotation angle during the simulation operation, a warning message (first warning message) indicating that fact is displayed on the display screen 61. That is, it is detected whether or not the inverted state occurs during movement from one teaching point to a next teaching point designated in the operation program.

Next, in step S103, when a rotation angle of any of the axes included in the robot model 101 is detected as being within the second predetermined value from the upper limit or the lower limit of the predetermined operation range of the axis during the simulation operation, a warning message (second warning message) indicating that fact is displayed on the display screen 61. That is, it is detected whether or not each of the axes comes to the vicinity of the operation range during movement from one teaching point to a next teaching point designated in the operation program. Next, in step S104, when a rotation amount of any of the axes included in the robot model 101 with reference to a rotational position of the robot model 101 in an orientation before the movement is detected to have exceeded a set rotation angle predefined for the axis during the simulation operation, a warning message (third warning message) indicating that fact is displayed on the display screen 61. That is, it is detected whether or not the rotation angle of each of the axes becomes excessive during movement from one teaching point to a next teaching point designated in the operation program.

Next, in step S104, when an interference among the robot model 101 mounted with the tool model 102, the workpiece model W, and the peripheral device models (103 and 104) is detected during the simulation operation, a warning message (fourth warning message) indicating that fact is displayed on the display screen.

In the process of executing the simulation operation illustrated in FIG. 11, the simulation execution section 54 may record a history of warning messages (a history indicating which warning message occurred for which teaching point). By executing the simulation operation illustrated in FIG. 11, an operator can cause the operation program to be fully executed from the beginning to the end and perceive the occurrence of the inverted state and the like. The operator can correct teaching points based on the simulation result.

While the present invention has been described above by using typical embodiments, it is to be understood that those skilled in the art can make changes, various other modifications, omissions, and additions to each of the above embodiments without departing from the scope of the present invention.

Not all the functional blocks of the robot programming device illustrated in FIG. 1 are required to be provided. For example, the robot programming device may be composed of the virtual space creation section 11, the model arrangement section 12, the movement position designation section 13, the robot model movement section 14, the arm inversion detection section 21, and the arm inversion correction section 23. In that case, when any axis is detected as being in the inverted state, the robot programming device corrects the orientation of the robot model so that the axis is no longer in the inverted state.

Not all of the process steps illustrated in FIG. 2 are required to be included in the teaching process. For example, a teaching process including steps S1 to S5 and S7 (a teaching process for detecting an inverted state) can also be implemented.

The programs for executing various types of processing such as the teaching process, the simulation operation, and the like according to the embodiment described above (FIGS. 2 and 11) may be recorded in various kinds of computer-readable recording media (e.g., semiconductor memories such as a ROM, an EEPROM, and a flash memory, a magnetic recording medium, optical disks such as a CD-ROM and a DVD-ROM, or the like).

| REFERENCE SIGNS LIST | |
|---|---|
| 10 | Robot programming device |
| 11 | Virtual space creation section |
| 12 | Model arrangement section |
| 13 | Movement position designation section |
| 14 | Robot model movement section |
| 21 | Arm inversion detection section |
| 22 | Arm inversion warning section |
| 23 | Arm inversion correction section |
| 31 | Operation range limit detection section |
| 32 | Operation range limit warning section |
| 33 | Operation range limit correction section |
| 41 | Overrotation detection section |
| 42 | Overrotation warning section |
| 43 | Overrotation correction section |
| 51 | Interference detection section |
| 52 | Interference warning section |
| 53 | Interference avoidance section |
| 54 | Simulation execution section |
| 60 | Display device |
| 61 | Display screen |
| 101 | Robot model |
| 102 | Tool model |
| 103 | Movable platform model |

-continued

| REFERENCE SIGNS LIST | |
|---|---|
| 104 | Machine model |

The invention claimed is:

1. A robot programming device configured to perform teaching of a robot program by arranging in a virtual space representing a workspace three-dimensionally and displaying on a display screen a robot model mounted with a tool model, a workpiece model, and a peripheral device model, the robot programming device comprising:
a processor configured to:
move a predetermined movable portion of the robot model from a first position to a second position in accordance with a teaching content;
detect whether or not any axis included in the robot model is in a predetermined state in which the axis is rotated by 180°±a first predetermined value from a reference rotation angle in response to the predetermined movable portion of the robot model being moved to the second position; and
correct, in response to any axis included in the robot model being detected as being in the predetermined state, an orientation of the robot model with the predetermined movable portion of the robot model being located at the second position according to predetermined rules so that the axis is no longer in the predetermined state,
wherein the predetermined rules include:
a first rule that a tool tip position of the robot model is not moved;
a second rule that only a rotation angle of the axis being detected as being in the predetermined state is corrected; and
a third rule that in response to the first rule and the second rule being unsatisfied, the tool tip position is moved by parallel translation to correct the orientation of the robot model.

2. The robot programming device according to claim 1, wherein the processor is further configured to receive a designation of the second position as a movement destination of the predetermined movable portion of the robot model in response to the predetermined movable portion of the robot model being located at the first position in the virtual space,
wherein the processor is configured to move the predetermined movable portion of the robot model to the second position designated as the movement destination.

3. The robot programming device according to claim 1, wherein the processor is further configured to cause the display screen to display, in response to any axis included in the robot model being detected as being in the predetermined state, a warning message indicating that the predetermined state has occurred.

4. The robot programming device according to claim 1, wherein the processor is configured to correct the orientation of the robot model in accordance with a predetermined correction condition including an axis to be corrected and a correction angle range of the axis.

5. The robot programming device according to claim 1, wherein the processor is further configured to:
detect whether or not a rotation angle of any axis included in the robot model is within a second predetermined value from an upper limit or a lower limit of a predetermined operation range of the axis in response to the robot model being caused to assume an orientation at the second position; and in response to a rotation angle of any axis included in the robot model being detected as being within the second predetermined value from the upper limit or the lower limit of the predetermined operation range of the axis, cause the display screen to display a warning message, and correct the orientation of the robot model at the second position so that the rotation angle of the axis is no longer within the second predetermined value from the upper limit or the lower limit of the predetermined operation range.

6. The robot programming device according to claim 5, wherein the processor is configured to correct the orientation of the robot model at the second position in accordance with a predetermined correction condition including an axis to be corrected and a correction angle range of the axis.

7. The robot programming device according to claim 1, wherein the processor is further configured to:

detect whether or not a rotation amount of any axis included in the robot model with reference to a rotational position of the robot model in an orientation before movement has exceeded a set rotation angle predefined for the axis in response to the robot model being caused to assume an orientation at the second position; and in response to the rotation amount having exceeded the set rotation angle predefined for the axis, cause the display screen to display a warning message, and correct an orientation of the robot model at the second position so that a rotation angle of the axis does not exceed the set rotation angle.

8. The robot programming device according to claim 7, wherein the processor is configured to correct the orientation of the robot model at the second position in accordance with a predetermined correction condition including an axis to be corrected and a correction angle range of the axis.

9. The robot programming device according to claim 1, wherein the processor is further configured to:

detect whether or not an interference occurs among the robot model mounted with the tool model, the workpiece model, and the peripheral device model in response to the robot model being caused to assume an orientation at the second position; and in response to occurrence of the interference being detected, cause the display screen to display a warning message, and correct the orientation of the robot model at the second position so that the interference no longer occurs.

10. A robot programming method configured to perform teaching of a robot program by arranging in a virtual space representing a workspace three-dimensionally and displaying in a display screen a robot model mounted with a tool model, a workpiece model, and a peripheral device model, the robot programming method comprising:

moving a predetermined movable portion of the robot model from a first position to a second position in accordance with a teaching content;

detecting whether or not any axis included in the robot model is in a predetermined state in which the axis is rotated by 180°±a first predetermined value from a reference rotation angle in response to the predetermined movable portion of the robot model being moved to the second position; and correcting, in response to any axis included in the robot model being detected as being in the predetermined state, an orientation of the robot model with the predetermined movable portion of the robot model being located at the second position according to predetermined rules so that the axis is no longer in the predetermined state, wherein the predetermined rules include:

a first rule that a tool tip position of the robot model is not moved;

a second rule that only a rotation angle of the axis being detected as being in the predetermined state is corrected; and a third rule that in response to the first rule and the second rule being unsatisfied, the tool tip position is moved by parallel translation to correct the orientation of the robot model.

11. A robot programming method configured to perform teaching of a robot program by arranging in a virtual space representing a workspace three-dimensionally and displaying in a display screen a robot model mounted with a tool model, a workpiece model, and a peripheral device model, the method comprising:

performing a simulation operation of the robot model in accordance with an operation program;

displaying a first warning message indicating that an axis is inverted, when any axis included in the robot model is detected as being in a predetermined state in which the axis is rotated by 180°±a first predetermined value from a reference rotation angle during the simulation operation;

displaying a second warning message indicating that a rotation angle of an axis is in a vicinity of a limit of an operation range, when a rotation angle of any axis included in the robot model is detected as being within a second predetermined value from an upper limit or a lower limit of a predetermined operation range of the axis during the simulation operation;

displaying a third warning message indicating that an axis has excessively rotated, when a rotation amount of any axis included in the robot model with reference to a rotational position of the robot model in an orientation before movement is detected to have exceeded a set rotation angle predefined for the axis during the simulation operation; and displaying a fourth warning message when an interference among the robot model mounted with the tool model, the workpiece model, and the peripheral device model is detected during the simulation operation.

* * * * *